United States Patent
Park et al.

[11] Patent Number: 5,495,137
[45] Date of Patent: Feb. 27, 1996

[54] PROXIMITY SENSOR UTILIZING POLYMER PIEZOELECTRIC FILM WITH PROTECTIVE METAL LAYER

[75] Inventors: Kyung T. Park, Berwyn, Pa.; Minoru Toda, Lawrenceville, N.J.

[73] Assignee: The Whitaker Corporation, Wilmington, Del.

[21] Appl. No.: 298,864

[22] Filed: Aug. 31, 1994

Related U.S. Application Data

[63] Continuation-in-part of Ser. No. 121,392, Sep. 14, 1993.

[51] Int. Cl.⁶ .................................................. H01L 41/08
[52] U.S. Cl. ........................................ 310/331; 310/800
[58] Field of Search ................................ 310/330, 331, 310/332, 334, 335, 800

[56] References Cited

U.S. PATENT DOCUMENTS

| | | | |
|---|---|---|---|
| 3,093,760 | 6/1963 | Tarasevich | 310/332 |
| 3,396,366 | 8/1968 | Midlock et al. | 340/38 |
| 3,816,774 | 6/1974 | Ohnuki et al. | 310/330 |
| 4,015,232 | 3/1977 | Sindle | 340/1 T |
| 4,056,742 | 11/1977 | Tibbetts | 310/357 |
| 4,278,962 | 7/1981 | Lin | 340/34 |
| 4,322,877 | 4/1982 | Taylor | 29/25.35 |
| 4,636,997 | 1/1987 | Toyama et al. | 367/140 |
| 4,675,959 | 6/1987 | Sprout | 310/800 |
| 4,803,670 | 2/1989 | Chen | 367/99 |
| 4,910,512 | 3/1990 | Riedel | 340/943 |
| 4,924,131 | 5/1990 | Nakayama et al. | 310/329 |
| 4,967,180 | 10/1990 | Wang | 340/436 |
| 4,980,869 | 12/1990 | Forster et al. | 367/99 |
| 5,028,920 | 7/1991 | Dombrowski | 340/904 |
| 5,059,946 | 10/1991 | Hollowbush | 340/435 |
| 5,076,384 | 12/1991 | Wada et al. | 180/169 |
| 5,160,927 | 11/1992 | Cherry et al. | 340/904 |
| 5,356,500 | 10/1994 | Scheinbeim et al. | 310/311 |
| 5,373,213 | 12/1994 | Smith | 310/355 |

OTHER PUBLICATIONS

M. Tamura et al.–"Electroacoustic Transducerds with Piezoelectric High Polymer Films"; J. Audio Eng. Society 1975; vol. 23; pp. 21–26.

*Primary Examiner*—Thomas M. Dougherty

[57] ABSTRACT

An ultrasonic proximity sensor particularly suited for outdoor environments having a transducer including a polymer piezoelectric film bonded to a protective metal layer. The transducer is mounted in the sensor housing so that the protective metal layer is exposed to the environment through a window of the sensor housing. The transducer can be implemented as an asymmetric bimorph structure, having an electrode bonded to a surface of the polymer piezoelectric film opposite the protective metal layer and between support members. Deformation of the polymer piezoelectric film between the protective metal layer and the electrode occurs upon application of a voltage thereto, generating an ultrasonic wave. The transducer can also be used as a receiver, generating an output voltage from the electrode upon impingement of an ultrasonic wave upon the protective metal layer. The transducer can also be implemented as a curved length mode transducer including an arcuate shaped support member for supporting the polymer piezoelectric film to be curved between the support members. The radius of the curved length mode transducer is selected so that the transducer can be resonant at the resonance frequency of the curved length mode, therefore vibrating at high frequency to generate an ultrasonic wave.

15 Claims, 12 Drawing Sheets

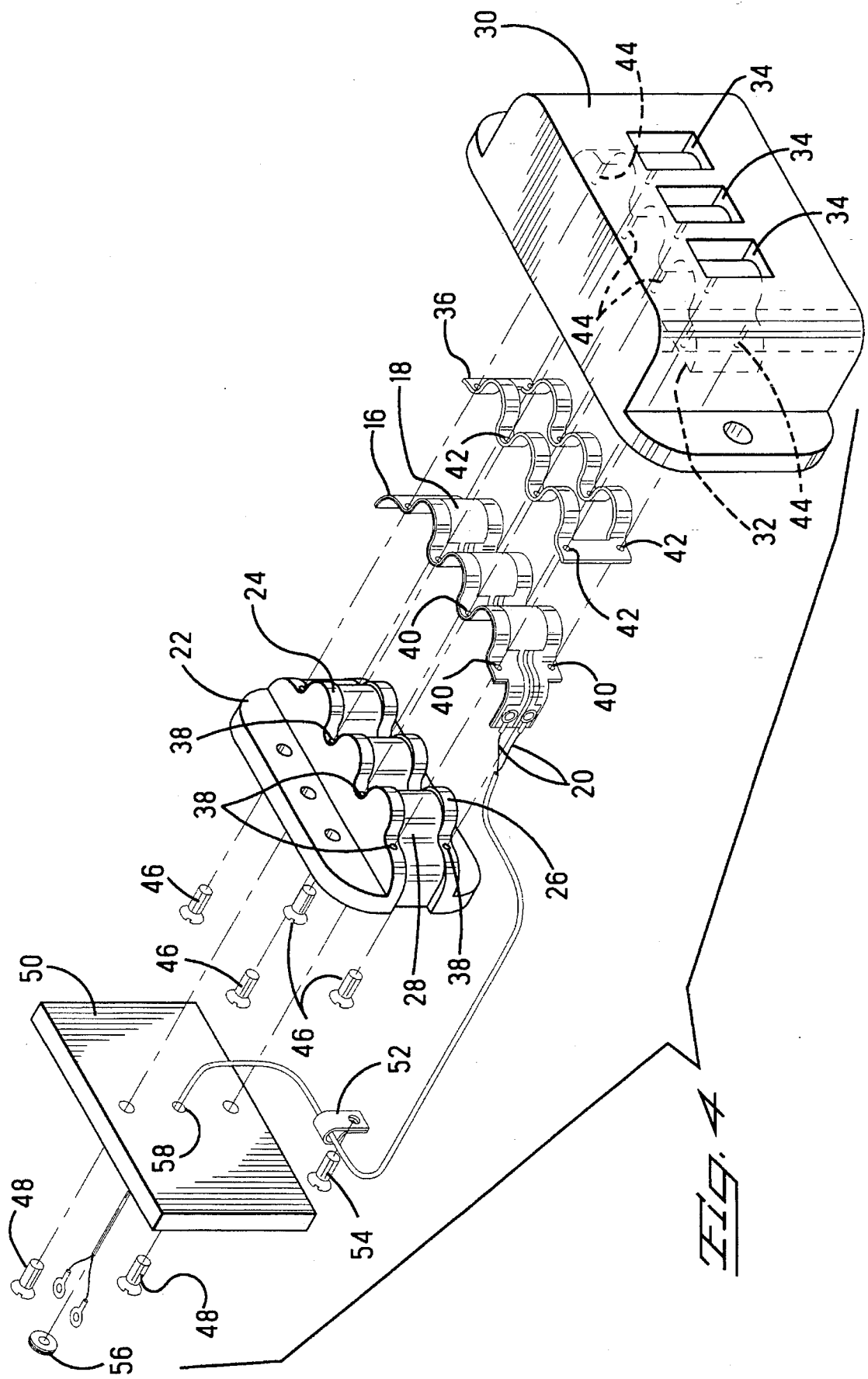

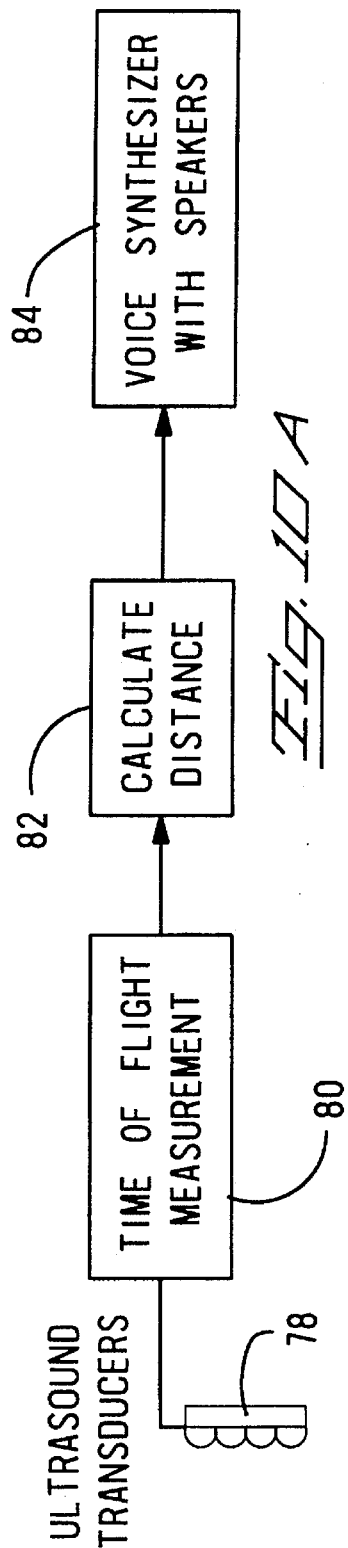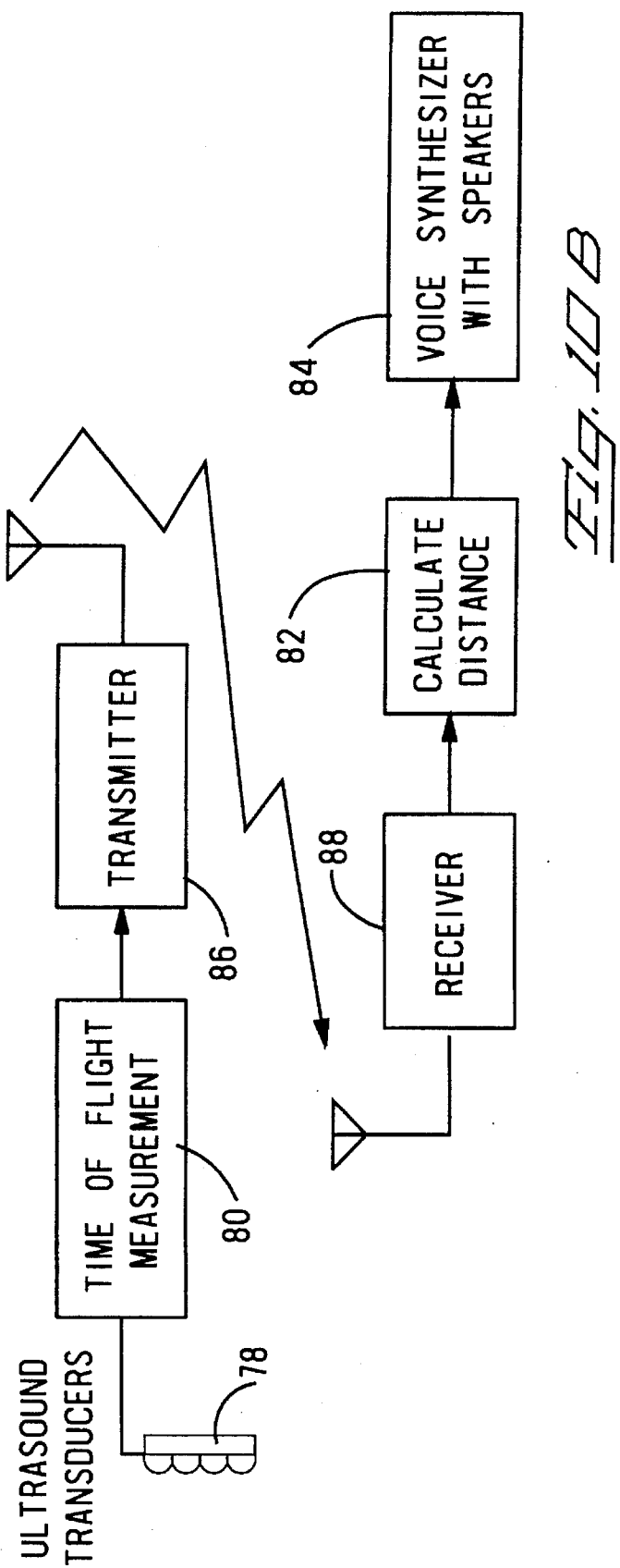

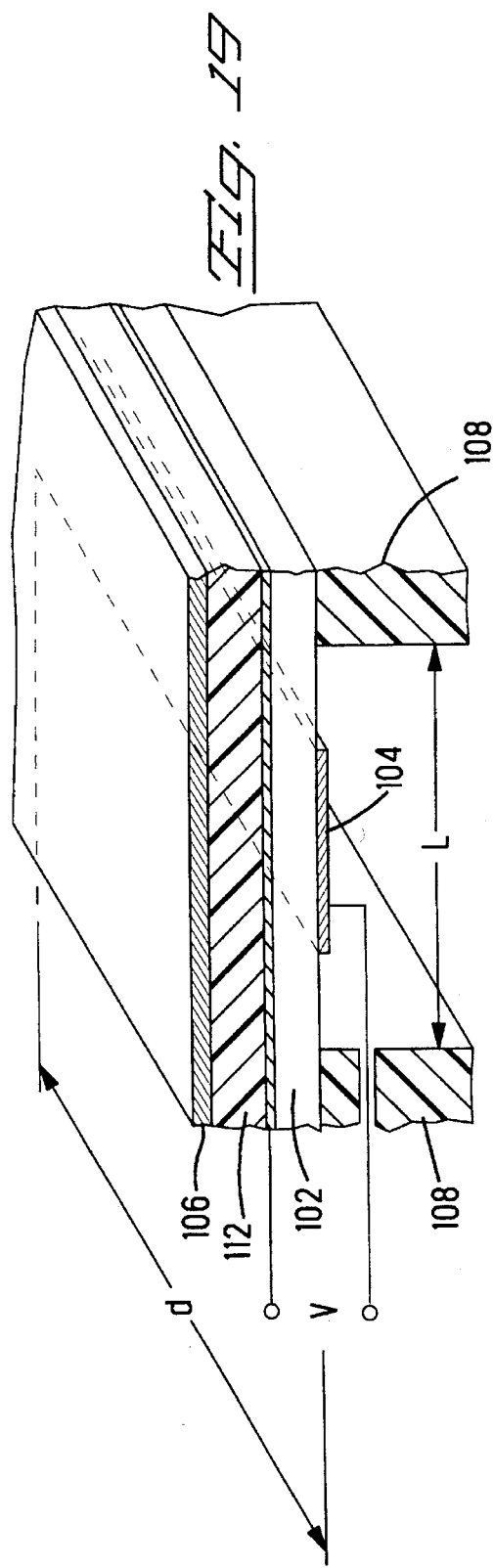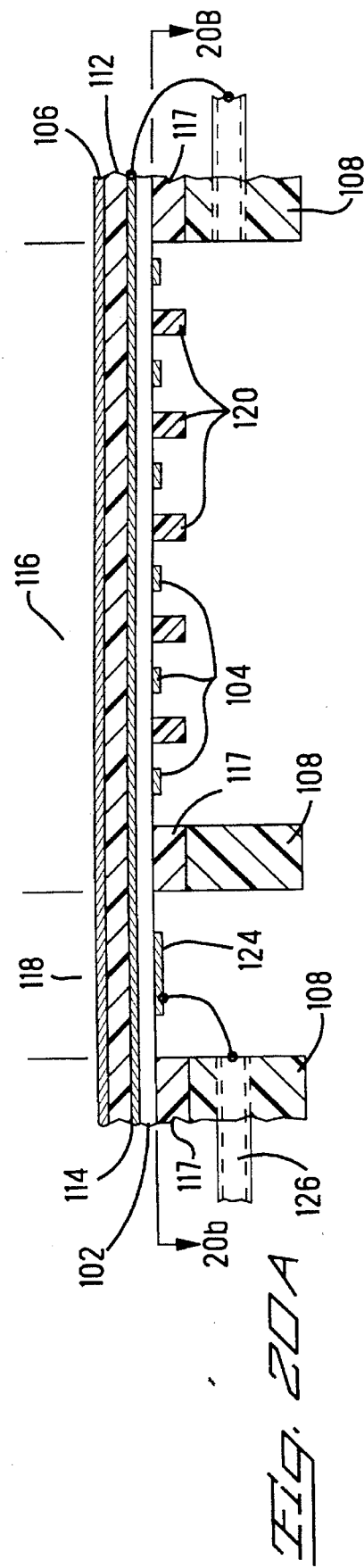

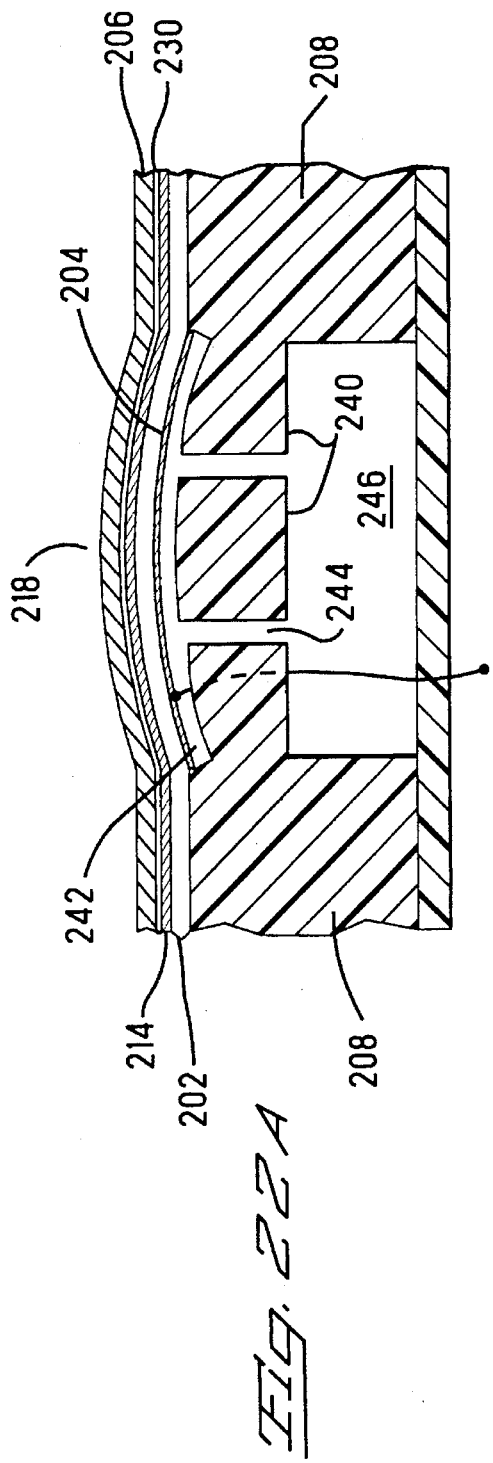
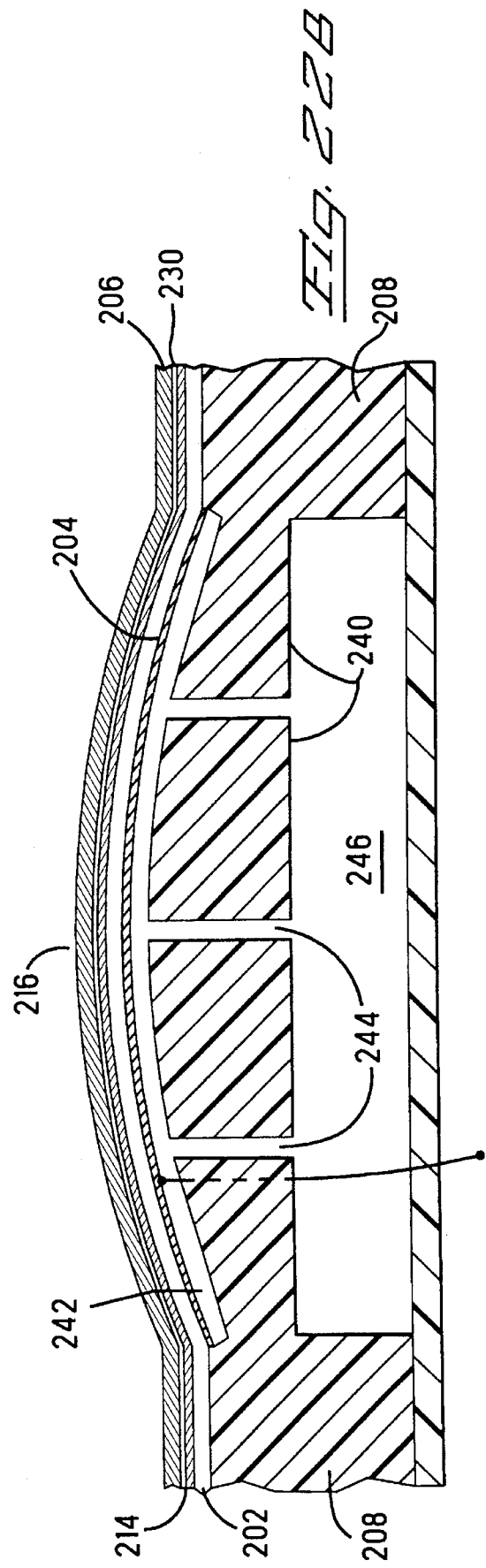

PROXIMITY SENSOR UTILIZING POLYMER PIEZOELECTRIC FILM WITH PROTECTIVE METAL LAYER

This application is a continuation-in-part application of U.S. application Ser. No.: 08/121,392, filed on Sep. 14, 1993.

BACKGROUND OF THE INVENTION

This invention relates to ultrasonic proximity sensors and, more particularly, to an improved ultrasonic proximity sensor utilizing polymer piezoelectric film in the transducer assembly.

Proximity sensors have many applications. For example, a proximity sensor mounted to a vehicle can provide a warning to the vehicle operator of the presence of an obstruction in the path of the vehicle. Thus, a proximity sensor mounted to the rear of a truck which is backing toward a loading dock can be utilized to alert the truck driver of the remaining distance to the loading dock. It is therefore an object of the present invention to provide a proximity sensor which may be utilized for such an application.

A proximity sensor utilizing radiated and reflected ultrasonic acoustic waves is a desirable form for use in such an application. The desired beam pattern for obstruction detection applications is a straight, wide and thin beam. It is therefore another object of the present invention to provide a transducer assembly for generating an ultrasonic acoustic wave having such desired beam pattern.

A proximity sensor mounted on the rear of a vehicle may be subject to damage by flying sand or stone particles from the road surface and physical impact, such as from brushes during washing of the vehicle for example. The proximity sensor will also be exposed to rain and cleaning water which may penetrate between the polymer piezoelectric film and a mounting assembly of the proximity sensor. It is therefore a further object of the invention to provide a durable ultrasonic proximity sensor utilizing a polymer piezoelectric film in a transducer assembly which is particularly suited for outdoor applications and capable of withstanding exposure to sand and stone particles, water, physical impact and similar conditions.

SUMMARY OF THE INVENTION

The foregoing and additional objects are attained in accordance with the principles of this invention by providing a transducer assembly for a proximity sensor which comprises an elongated polymer piezoelectric film. The assembly also includes a support for supporting the film as an elongated series of arcuate segments. All of the arcuate segments are curved in the same direction and have the same radius of curvature. In addition, there is provided an electric field supply for applying a varying electric field across the thickness of the film within each of the arcuate segments to cause an ultrasonic acoustic wave to be radiated from the film.

In accordance with an aspect of this invention, the film support includes a rigid backing member having a support surface shaped as an elongated series of arcuate segments all curved in the same direction and all having the same radius of curvature, and a rigid cover member adapted for placement so that the film is between the backing member and the cover member. The cover member has a cavity with an interior surface shaped complementarily to the backing member support surface. The film support also includes a member for securing the cover member to the backing member so that the film is tightly gripped between the backing member support surface and the cover member cavity interior surface.

In accordance with a further aspect of this invention, the cover member is formed with a series of spaced apertures in open communication with the cavity and each associated with a respective one of the arcuate segments of the film, and the transducer assembly further includes a spacer for maintaining the film in spaced relation relative to the backing member in regions corresponding to the apertures of the cover member.

In accordance with another aspect of this invention, the backing member support surface is formed as a pair of spaced apart relatively narrow support surfaces and the spacer includes a surface region of the backing member between the pair of narrow support surfaces which is generally parallel to the pair of narrow support surfaces and spaced therefrom in a direction away from the cover member.

In accordance with yet another aspect of this invention, the electric field supply includes a pattern of electrodes formed as conductive areas on both sides of the film, the conductive areas on each side of the film being spaced apart and each being associated with a corresponding conductive area on the other side of the film directly across the thickness of the film so as to form a series of spaced opposed pairs of electrodes.

In accordance with yet a still further aspect of this invention, the polymer piezoelectric film is bonded to a metal layer and the metal layer is driven so that it vibrates. The transducer assembly is mounted so that the metal layer is exposed outward as an exterior face and therefore protects the polymer piezoelectric film from the environment. In a first embodiment of this further aspect of the invention, the transducer assembly is an asymmetric bimorph structure. The support structure is formed as a pair of spaced apart relatively narrow support areas on which both ends of the bonded metal layer/polymer piezoelectric film are clamped or secured thereto. The metal layer is oriented as an exterior face of the transducer assembly. The metal layer serves as a first electrode and as the protective layer. A second opposing electrode is formed along a central region of the polymer piezoelectric film spaced from and intermediate the support areas. Upon application of a voltage across the metal layer and the second opposing electrode, expansion and shrinkage occurs along the polymer piezoelectric film therebetween, thus generating an ultrasonic wave. The transducer assembly can also function as a receiver which generates an output voltage upon impingement of an ultrasonic wave on the metal layer. In a further embodiment of this aspect of the invention, a transmitter array is formed including a plurality of transducer assemblies implemented in parallel.

In a second embodiment of this further aspect of the present invention, the transducer assembly is a curved length mode structure. The bonded metal layer/polymer piezoelectric film is clamped at both ends to support members, the metal layer oriented exteriorly as a protective layer and serving as a first electrode. A second opposing electrode is formed on the polymer piezoelectric film intermediate the support members. An arcuate-shaped support member supports the polymer piezoelectric film to be curved between the support members. The radius of curved area is selected so that the transducer vibrates at a high frequency resonance upon application of a voltage across the polymer piezoelectric film, generating an ultrasonic wave. The transducer assembly can also function as a receiver, generating an output voltage upon impingement of an ultrasonic wave on the metal layer.

BRIEF DESCRIPTION OF THE DRAWINGS

The present invention will become more fully understood from the detailed description given hereinbelow and the accompanying drawings which are given by way of illustration only, and thus, are not limitative of the present invention and wherein:

FIG. 4 is an exploded perspective view of an illustrative practical transducer assembly according to this invention;

FIGS. 10A and 10B are illustrative block diagrams of two embodiments of a distance determination and indicating arrangement according to this invention;

FIG. 19 illustrates a sectional view of an ultrasonic asymmetrical bimorph transducer of an embodiment of the present invention in greater detail;

FIG. 20A illustrates a sectional view of a proximity sensor unit of an embodiment of the present invention including a receiver and transmitter array;

FIG. 22A illustrates a sectional view of a curved length mode receiver of a proximity sensor unit of a further embodiment of the present invention;

FIG. 22B illustrates a sectional view of a curved length mode transmitter of the proximity sensor unit;

DETAILED DESCRIPTION

Figure 1:
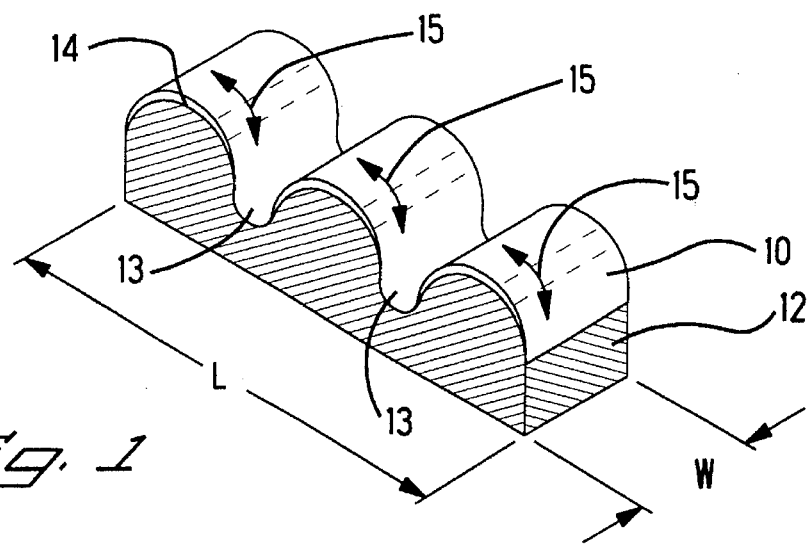
FIG. 1 is a perspective view schematically illustrating an ultrasonic acoustic wave generating transducer utilizing polymer piezoelectric film constructed in accordance with this invention for generating a straight ultrasound beam.
Figure 2:
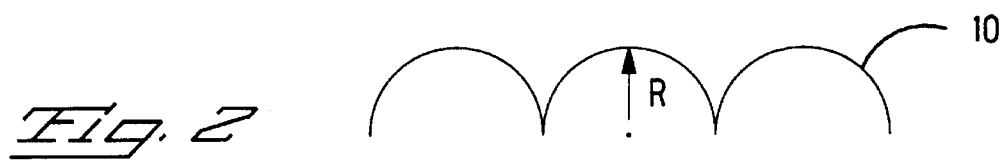
FIG. 2 is a side view showing the polymer piezoelectric film of FIG. 1 and is useful for explaining how the operating frequency of the transducer assembly is determined.

A polymer piezoelectric film is known to be a material that can be used to construct a wideband flexible ultrasound transducer. The desired beam pattern for detecting an obstruction is a straight, wide and thin beam. By lengthening the ultrasound source, the generated beam becomes a relatively straight beam. FIG. 1 illustrates such a transducer according to this invention. As shown therein, the polymer piezoelectric film 10 is elongated and is supported as a series of arcuate segments. The arcuate segments all have the same predetermined radius of curvature and are all curved in the same direction. The film 10 is supported on an appropriately shaped support member 12 so as to maintain a space 14 between each of the arcuate segments of the film 10 and the support member 12. When a varying electric field of appropriate frequency is applied across the thickness of the piezoelectric film 10, the film 10 vibrates at that frequency to cause an ultrasonic acoustic wave to be radiated therefrom. The space 14 allows such vibration without interference by the support member 12.

Polymer piezoelectric material, specifically polyvinylidene fluoride (PVDF or $PVF_2$), is known to be formable into a flexible film even after stretching and poling. When this film 10 is held in a curved shape with two regions 13 clamped, the region between the clamped points vibrates in the direction normal to the plane (increasing or decreasing the radius) by application of AC voltage across the film thickness.

This vibration is caused by expansion or contraction of the length along the molecular chain direction (indicated by the arrows 15) which is chosen to be parallel to the tangential direction to the arc of the film 10. This principle was described in M. Tamura et al "Electroacoustical Transducers with Piezoelectric High Polymer" J. Audio Eng. Society 1975 Vol. 23. p. 21–26. When the drive signal frequency is varied, the back-and-forth vibration shows a maximum at a resonant frequency $f_o$. This resonance is caused by the mass of the film and its elasticity. The resonant frequency is given by the following formula:

$$f_o = (1/2\pi R) \times \sqrt{Y/p} \qquad (1)$$

where R equals the radius of the arcuate segment, Y equals Young's modulus and p is the density of the piezoelectric film 10. For example, if R equals 0.2 inches, then the operating frequency $f_o$ equals 45 Khz.

Figure 3A:
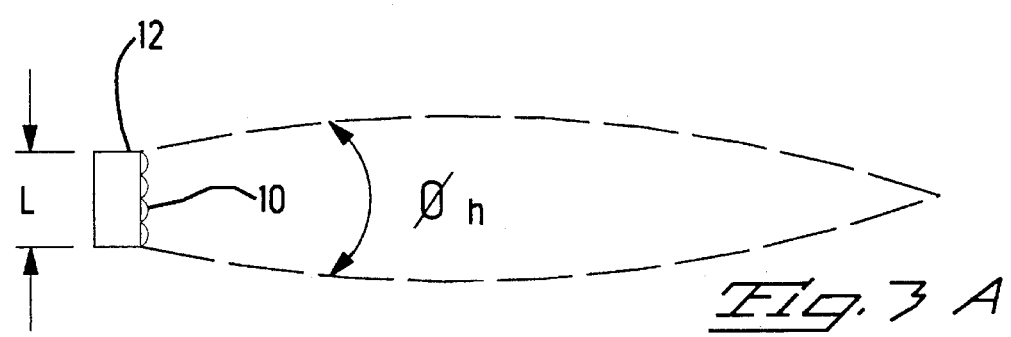
FIGS. 3A and 3B illustrate top and side views, respectively, of an inventive transducer assembly respectively showing the horizontal and vertical beam spread angles.
Figure 3B:
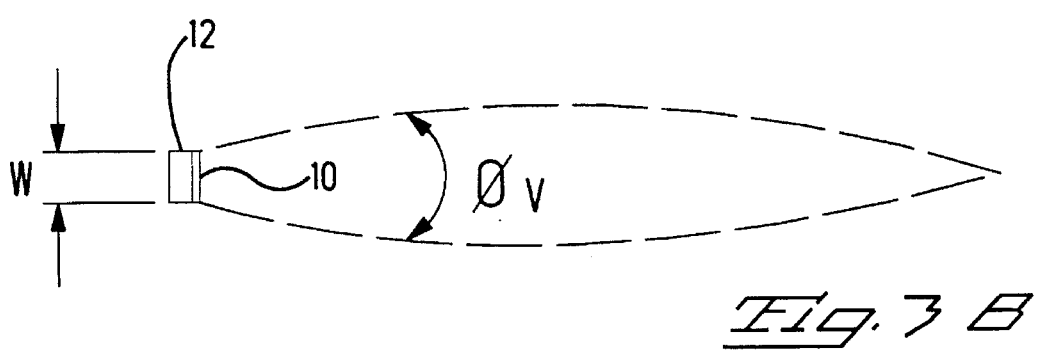

The beam angle of the radiated ultrasonic acoustic wave is determined by the size of the transducer, as shown in FIGS. 3A and 3B. For a transducer length L and width W, the horizontal beam angle $\phi_h$ is given by the following formula:

$$\phi_h = 2 \arcsin ((1.895)) V_s/(\pi f_o L)) \qquad (2)$$

and the vertical beam angle $\phi_v$ is given by the following formula:

$$\phi_v = 2 \arcsin (1.895 \ V_s/(\pi f_o W)), \qquad (3)$$

where $V_s$ is the velocity of sound in air. As examples, $\phi_h = 0°$ for L=7 feet, $\phi_h = 2.5°$ for L=8 inches, and $\phi_v = 5°$ for W=4 inches.

FIG. 4 illustrates a practical construction of a transducer assembly of the type schematically shown in FIG. 1. As shown in FIG. 4, an elongated piezoelectric film 16 is provided with a pattern of electrodes 18 on its surface. The electrodes 18 are conductive areas, preferably silver ink, deposited on both sides of the film 16. The electrodes 18 on each side of the film 16 are spaced apart and generally rectangular in configuration and each has an associated conductive area on the other side of the film 16 directly across the thickness of the film so as to form a series of spaced opposed pairs of electrodes. All of the electrodes 18 on each side of the film 16 are interconnected by a pattern of silver ink and at one end of the film are connected to the wires 20. A varying electrical signal applied to the wires 20 at an appropriate frequency (e.g., 45 Khz) causes the piezoelectric film 16 to vibrate and produce an ultrasonic acoustic wave.

A backing member 22 is provided to support the film 16 as a series of arcuate segments. Thus, the backing member 22 includes a first support surface 24 and a second support surface 26. The support surfaces 24, 26 comprise a pair of spaced apart relatively narrow surfaces of the backing member 22, each of which is shaped as a series of arcuate segments all having the same predetermined radius of curvature and all being curved in the same direction. The radius of curvature of each of the segments is selected for the desired operating frequency of the transducer assembly, as previously discussed. In order to maintain appropriate spacing between the film 16 and the backing member 22 to allow the film 16 to vibrate, the backing member 22 is formed with a further surface region 28 between the pair of support surfaces 24, 26. The surface region 28 is generally parallel to the support surfaces 24, 26, but is displaced below the surfaces 24, 26.

In order to hold the film 16 against the backing member 22 and preserve the desired arcuate shape of the film 16, there is provided a cover member 30. The cover member 30 has a cavity 32 with an interior surface which is shaped complementarily to the support surfaces 24, 26. The interior surface of the cavity 32 is continuous between the portions which are complementary to the support surfaces 24, 26, so that when the cover member 30 is mounted to the backing member 22, there is a space between the interior surface of the cavity 32 and the displaced surface region 28 of the backing member 22.

The cover member 30 is formed with a series of spaced apertures 34 in open communication with the interior cavity 32. Each of the apertures 34 is associated with a respective one of the arcuate segments of the backing member 22, and hence the arcuate segments of the film 16, so that the acoustic waves produced when the film 16 is caused to vibrate can escape from the cover member 30.

The assembly shown in FIG. 4 also includes a flexible gasket 36 between the film 16 and the cover member 30, which functions to seal and protect the remainder of the assembly from the elements.

To properly align the backing member 22, the film 16, the gasket 36, and the cover member 30, each of the backing member 22, the film 16, and the gasket 36 is formed with a plurality of appropriately positioned and registrable holes 38, 40 and 42, respectively, and the cover member 30 is molded with a plurality of corresponding pins 44 within the interior cavity 32. During assembly, the pins 44 extend through the aligned holes 38, 40 and 42. A plurality of screws 46 secure the backing member 22 to the cover member 30, with the film 16 and the gasket 36 therebetween, and the screws 48 secure a back plate 50 to the backing member 22 and the cover member 30 as part of the final assembly. Strain relief for the wires 20 is provided by the strain relief element 52 which is secured to the backing member 22 by the screw 54, and a gasket 56 is provided to seal the opening 58 in the back plate 50 through which the wires 20 extend.

Figure 5:
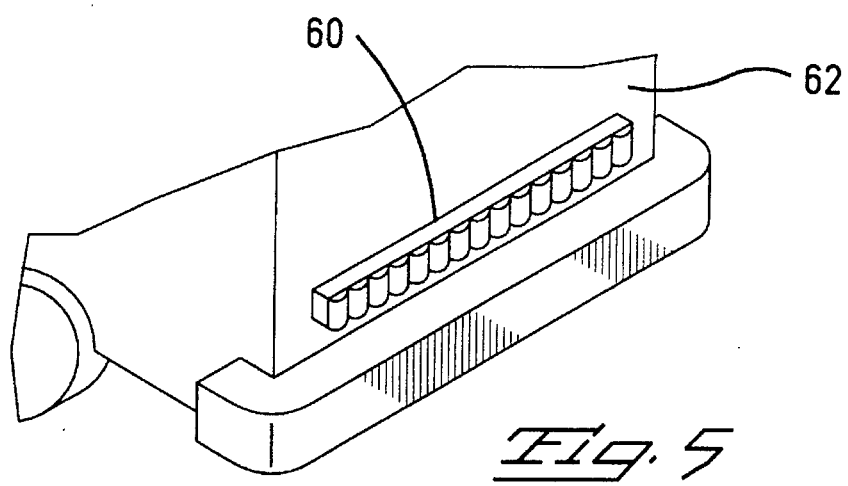
FIG. 5 shows an illustrative mounting arrangement for the assembly of FIG. 4.

FIG. 5 illustrates the mounting of an elongated transducer assembly 60 to the rear of a vehicle, illustratively a truck 62. As shown, the assembly 60 is an elongated version of the assembly depicted in FIG. 4.

Figure 6A:
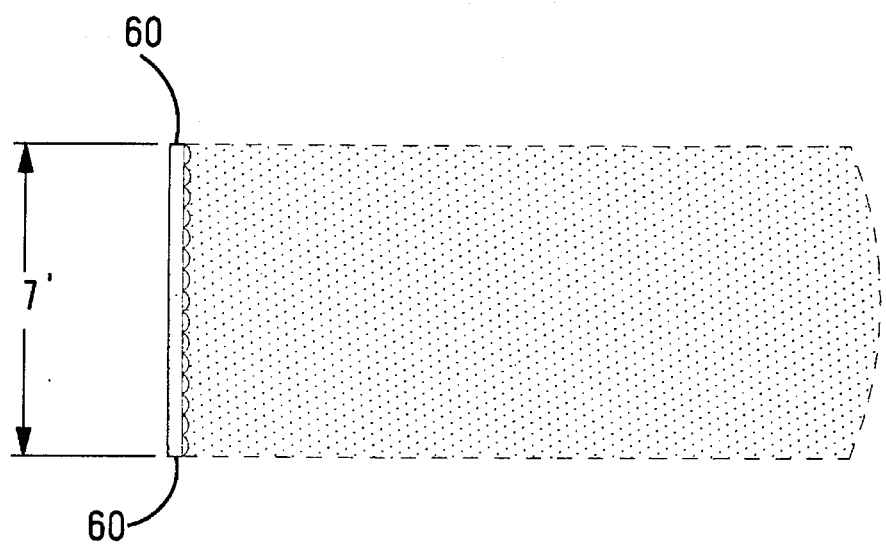
FIGS. 6A and 6B illustrate top and side views, respectively, of a first embodiment of a proximity sensor utilizing a single transducer assembly for both transmission and reception.
Figure 6B:
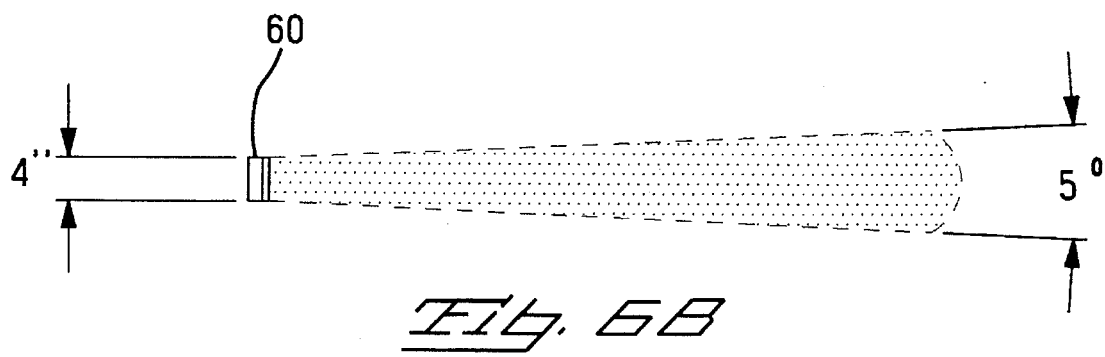

FIGS. 6A and 6B illustrate top and side views of the transducer assembly 60 (FIG. 5) showing the beam pattern thereof. With the length of the transducer assembly 60 being approximately seven feet, the top view of FIG. 6A shows the beam pattern to be straight and the side view of FIG. 6B shows, for a height of four inches for the assembly 60, that the vertical beam spread is 5°. To maximize system efficiency, all of the arcuate segments of the piezoelectric film making up the assembly 60 are active during the transmission mode and only one or two of the arcuate segments are active during the receive mode.

Figure 7:
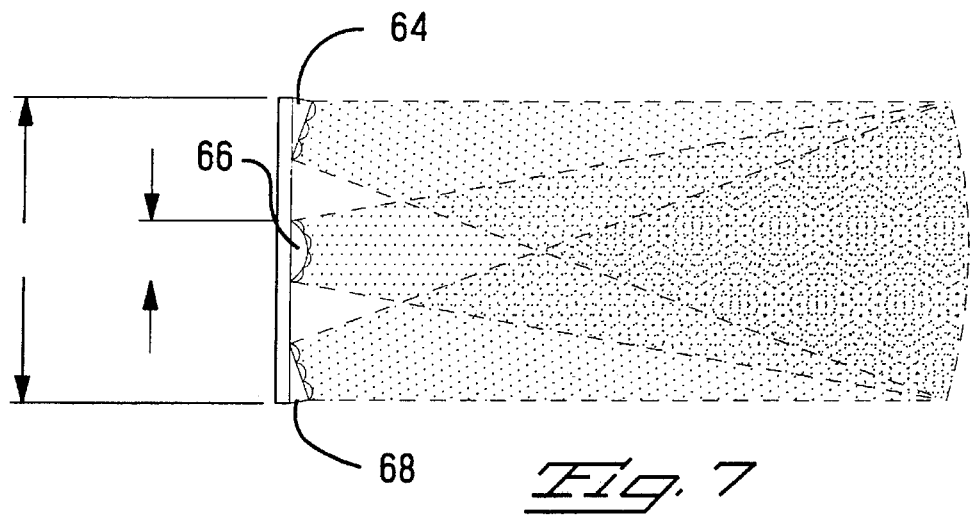
FIG. 7 shows a top view of a second embodiment of a proximity sensor according to this invention utilizing three separate transducer assemblies, each of which functions as both a transmitter and a receiver.

FIG. 7 is a top view of an embodiment of a proximity sensor which utilizes three separate transducer assemblies 64, 66 and 68, each of which is constructed as shown in FIG. 4, with the exception that the central transducer assembly 66 is curved, rather than straight. Thus, as shown in FIG. 7, the assemblies 64, 66 and 68 are mounted with their major axes lying substantially in a single horizontal plane. The flanking transducer assemblies 64 and 68 are equally spaced from the central transducer assembly 66 and are oppositely angled each toward the central transducer assembly 66. Since the assemblies 64, 66 and 68 are relatively short, they have a noticeable beam spread. However, as shown in FIG. 7, by utilizing the appropriate mounting angles for the flanking assemblies 64 and 68, the overall beam, made up of overlapping beams, can be considered to be relatively straight. Additionally, it will be noted that there are two blind zones between pairs of the transducer assemblies 64, 66 and 68, but these blind zones can be minimized by properly arranging the mounting angles for the flanking assemblies 64 and 68. Each of the transducer assemblies 64, 66 and 68 is operated as both a transmitter and receiver.

Figure 8:
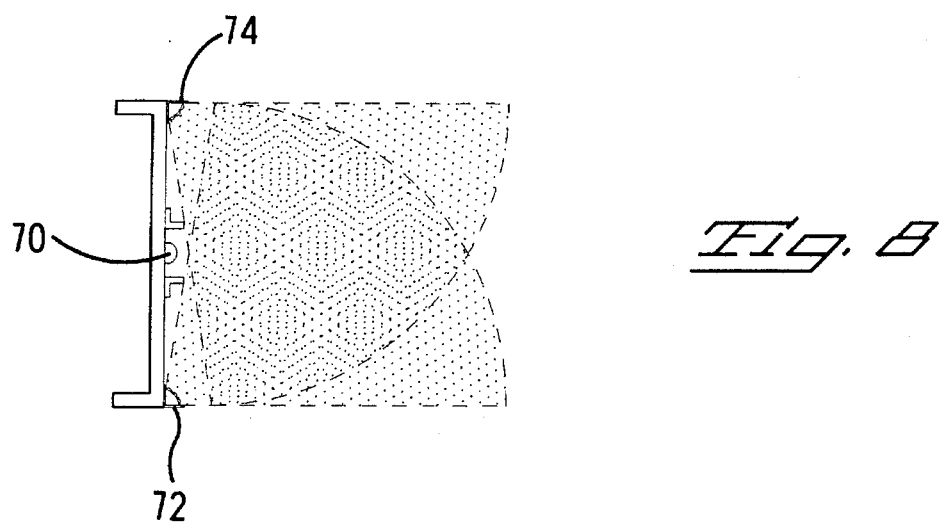
FIG. 8 shows a top view of a third embodiment of a proximity sensor according to this invention utilizing three transducer assemblies, two of which operate as transmitters and the third of which operates as a receiver.

FIG. 8 is a top view of a further embodiment wherein a single arcuate segment transducer assembly 70 is utilized as a receiver and a pair of transmitter transducer assemblies 72 and 74, each of which produces a substantially 90° beam pattern, are equally spaced on either side of the transducer assembly 70. With the arrangement shown in FIG. 8, the detection range is limited, being substantially the same as the spacing between the transducer assemblies 72 and 74, but measurement accuracy is very high.

Figure 9:
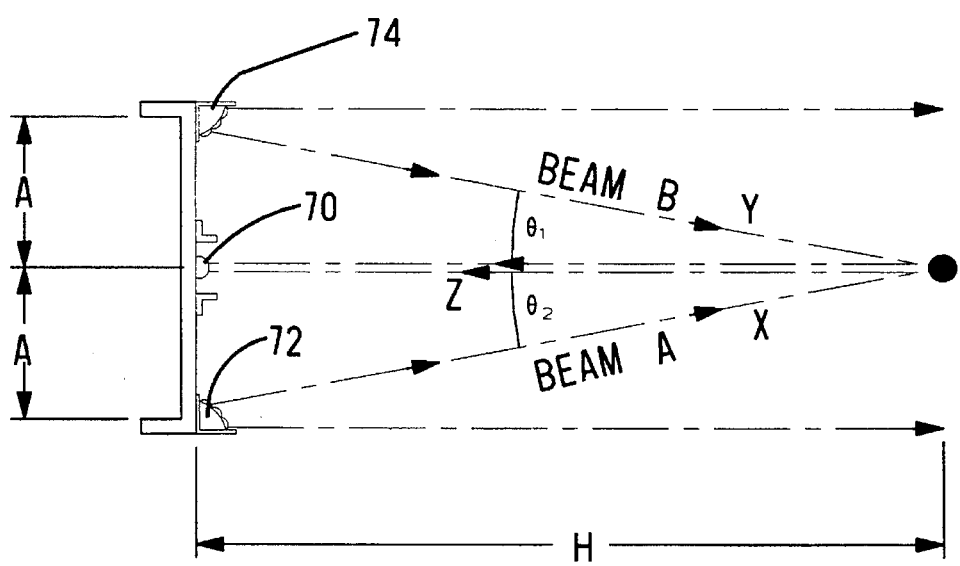
FIG. 9 is a diagram useful for explaining how the distance between the sensor of FIG. 8 and an obstruction can be calculated.

FIG. 9 illustrates how the distance between an obstruction 76 and the proximity sensor of FIG. 8 can be calculated from the measured time of flight from the transmitters 72, 74 to the receiver 70. Thus, when an acoustic wave is transmitted from the assembly 72, reflected from the obstruction 76, and received by the receiver 60, its measured time of flight $k_1$ is:

$$k_1 = (X+Z)/V_s \qquad (4)$$

and the time of flight $k_2$ from the transmitter 74 is:

$$k_2 = (Y+Z)/V_s; \qquad (5)$$

where $V_s$ is the velocity of sound in air.
X, Y and Z are solved from the following equations:

$$A^2 = X^2 + Z^2 - 2XZ \cos\theta_1 \qquad (6)$$

$$A^2 = Y^2 + Z^2 - 2YZ \cos\theta_2 \qquad (7)$$

$$(2A)^2 = X^2 + Y^2 - 2XY \cos(\theta_1\theta_2), \qquad (8)$$

where A is the known spacing between each of the transmitters 72, 74 and the receiver 70. The distance H can then be calculated from X, Y and Z using known trigonometric and geometric relations.

FIG. 10A illustrates an application of the present invention wherein a transducer assembly 78, of the type described, is connected to circuitry 80 which measures the time between transmission and reception of an ultrasonic pulse. This measurement is provided to distance calculator 82 which determines the distance to the obstruction and provides this information to the voice synthesizer 84, which provides an audible indication to the driver. Alternatively, as shown in FIG. 10B, the measurement circuit 80 and the calculator circuit 82 can be connected via a wireless transmission scheme comprising the transmitter 86 and the receiver 88 if it is more convenient to use this method than running wires between the front and rear of a vehicle.

Figure 11A:
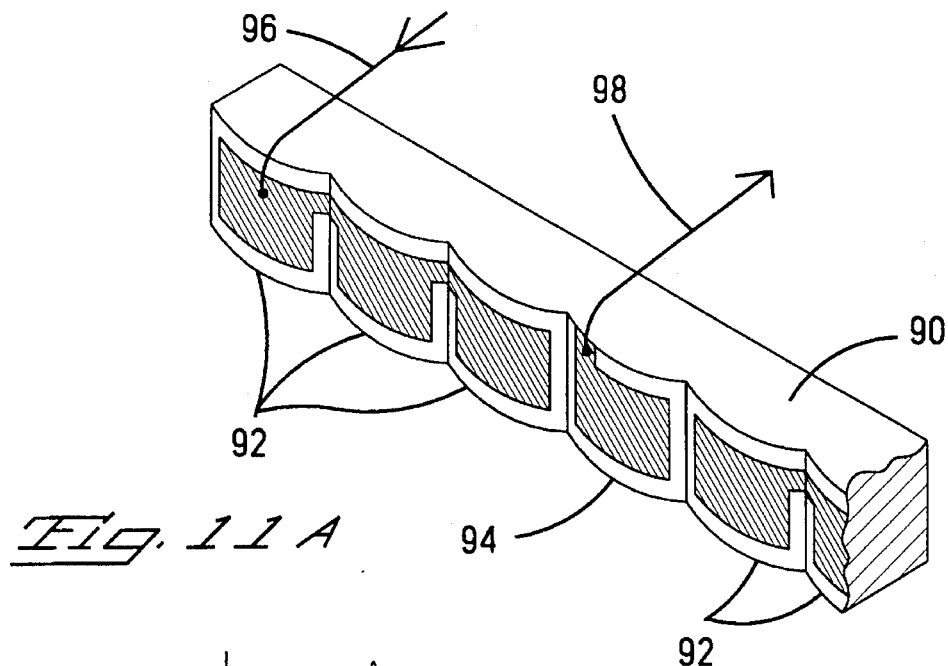
FIGS. 11A and 11B respectively show a schematic view of a transducer assembly and illustrative waveforms useful for illustrating the self diagnostic capability of the sensor according to this invention.
Figure 11B:
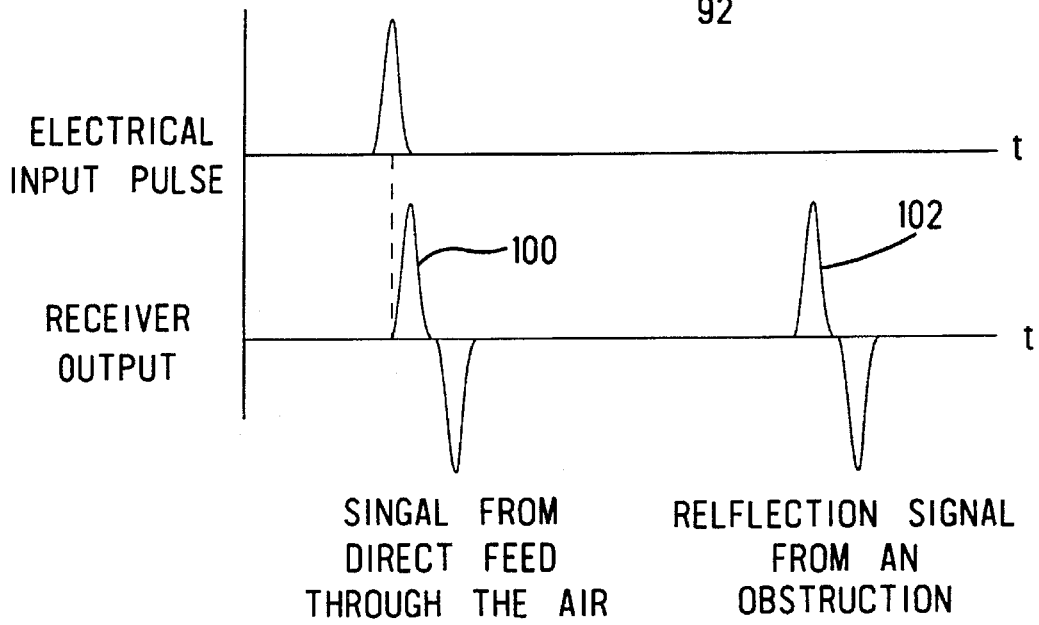

An advantage of utilizing the piezoelectric film in a transducer assembly of the type described is that a self diagnostic function can be designed. Thus, as shown in FIG. 11A, the transducer assembly 90 is made up of transmitting elements 92 and receiving elements 94. When a pulse is applied to the transmitting elements 92 over the lead 96, the generated acoustic wave is directly fed to the receiving element 94 through the air. FIG. 11B illustrates the input electric pulse and the output of the receiver element 94 over the lead 98 which includes a pulse 100 in response to the direct feed through the air followed by a pulse 102 in response to a reflected signal from an obstruction. The first pulse 100 is used for diagnostic purposes to indicate that the system is operative, but is ignored for measuring distance, when only the second pulse 102 is considered.

Figure 12:
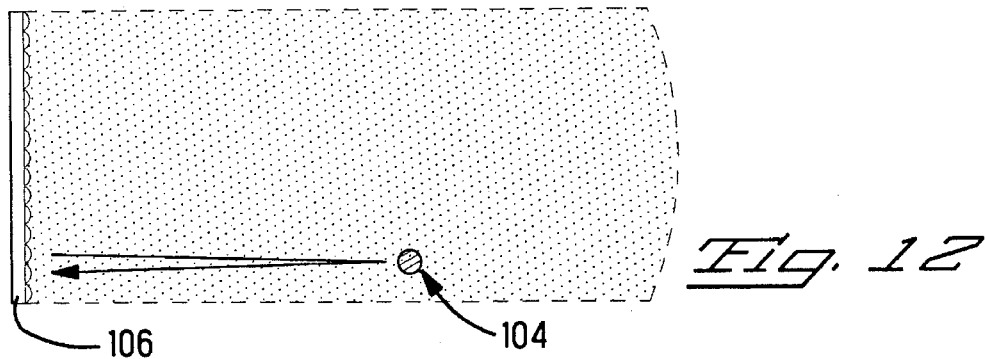
FIG. 12 shows how the two dimensional position of an obstruction can be determined in accordance with this invention.

FIG. 12 illustrates how the two dimensional position coordinates of an obstruction 104 can be determined. Thus, as shown in FIG. 12, the transducer assembly 106 is made up of a plurality of individual transmitter elements. Each of the elements is activated in sequence and by calculating the time of flight of the acoustic pulse to each of the receiver elements, the position coordinates of the obstruction 104 can be determined in two dimensions.

A further embodiment of the present invention will now be described relating to an ultrasonic proximity sensor transducer assembly particularly adapted for use in outdoor applications, such as being mounted on the rear of a vehicle. A vehicle backup sensor using a PVDF ultrasonic transducer requires a special mounting structure for providing protection against sand and stone which may be thrown up from the road surface, rain or cleaning water and physical impact such as cleaning brushes or the like. The water must be prevented from penetrating between the PVDF film and its holder. The transducer assembly must be durable so as to permit the cleaning of dirt or dust from an outer surface thereof.

A proposed solution is to mount a transducer assembly within an open ended metal box having a wire mesh cover. However, the wire mesh cover makes it extremely difficult to clean dust and dirt from the surface of the transducer assembly. Moreover, an ultrasonic wave generated by the transducer assembly will be reflected at the metal surface of the wire mesh, regardless of how thin the wire mesh is, for example, in the case of thin brass or steel sheets with 50 micron thickness, the reflectivity at 40 kHz is nearly 100%. Therefore, the wire mesh reflects the wave in proportion to the projected area of the wire. Accordingly, a PVDF ultrasonic transducer cannot be mounted and confined within a metal box since the ultrasonic wave cannot efficiently radiate through the metal structure.

The ultrasonic transducer of the present invention alleviates the above-described problems. The PVDF film is bonded to a metal layer and the metal layer is driven so that it vibrates. The metal layer is formed as an exterior layer exposed to the environment. The metal layer protects the PVDF film from sand, stones, water and any other physical impact. A proximity sensor implementing the bonded PVDF/metal layer is therefore durable and particularly suited for use as a vehicle sensor for example. An asymmetric bimorph structure will be described hereinafter.

Figure 13:
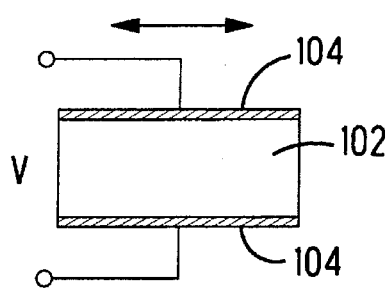
FIG. 13 illustrates a sectional view of a transducer.
Figure 14:
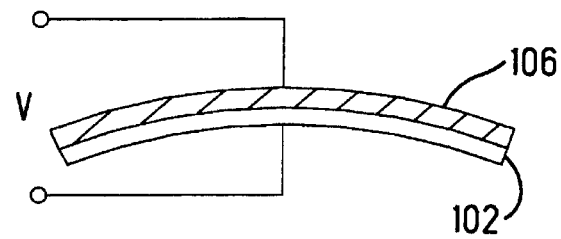
FIG. 14 illustrates a sectional view of an asymmetrical transducer.

A piezoelectric film 102 having two electrodes 104 bonded thereto is generally illustrated in FIG. 13. The piezoelectric material 102 may be PVDF, a copolymer of PVDF or tetrafluoroethylene. As noted above, the electrodes 104 must be bonded to the PVDF film 102. Upon application of an AC voltage across the thickness of the PVDF film 102 via electrodes 104, the PVDF film 102 expands or shrinks along the molecular chain direction, or shrinking direction as designated by the illustrated arrow. As illustrated in FIG. 14, when the PVDF film 102 is bonded to a metal or any non-piezoelectric layer 106, the expansion or shrinking motion is converted to a bending or flexing motion. The bonded PVDF/metal layer of FIG. 14 which is capable of bending upon application of an AC voltage is known as an asymmetrical bimorph. In contrast, a symmetrical bimorph is formed of first and second piezoelectric layers in which one of the layers expands while the other contracts.

Figure 15:
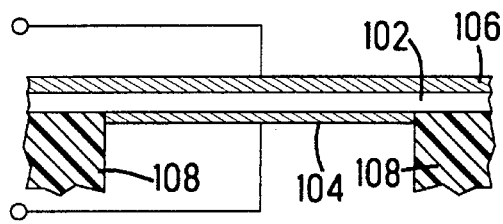
FIG. 15 illustrates a sectional view of an asymmetrical bimorph transducer secured at both ends to support members.

When both ends of the asymmetric bimorph of FIG. 14 are clamped to support members 108 as illustrated in FIG. 15, the bending motion of the bimorph structure is completely suppressed and vibration does not occur. In FIG. 15, metal layer 106 bonded to a first surface of the PVDF film functions as an electrode. Another electrode 104 is bonded to an opposite second surface of the PVDF film 102 along the entire length thereof between support members 108.

Figure 16:
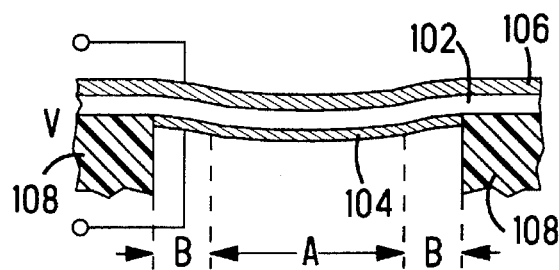
FIG. 16 illustrates a sectional view of an asymmetrical bimorph transducer and the necessary deformation required for radiation of an ultrasonic wave.

As illustrated in FIG. 16, vibration of the bimorph structure would require expansion of the PVDF film 102 in central region A and shrinkage of the PVDF film 102 in edge regions B near the support members 108. However, the voltage induced strain of a bimorph structure is uniform along the PVDF film between the opposing electrodes and the necessary deformation as illustrated in FIG. 16 required for vibration and radiation of an ultrasonic wave cannot be achieved. Accordingly, the bimorph structure of FIG. 16 cannot be excited to produce an ultrasonic wave.

Figure 17:
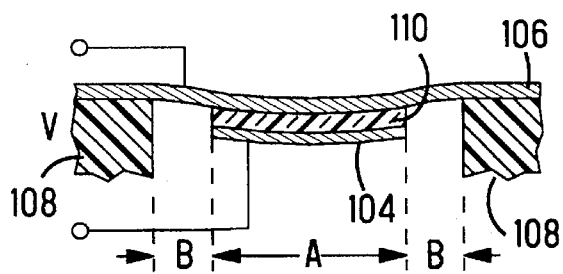
FIG. 17 illustrates a sectional view of a conventional ceramic piezoelectric asymmetrical bimorph transducer.

A known bimorph structure suitable for use with a ceramic piezoelectric material such as PZT, or lead zirconate titanate, is illustrated in FIG. 17. As shown, the B regions of the ceramic piezoelectric material 110 are removed near the support members 108 so that the ceramic piezoelectric material 110 only remains along the central region A. The electrode 104 is bonded on the surface of the ceramic piezoelectric material 110 in central region A. The uniform voltage induced strain of the bimorph structure occurs in the ceramic piezoelectric material 110 between the electrode 104 and the corresponding opposing portion of metal layer 106. The bimorph structure is therefore capable of vibration since only the ceramic piezoelectric material 110 expands.

However, a problem with the bimorph structure of FIG. 17 exists in that the ceramic piezoelectric material is brittle and difficult to handle and is not flexible. The structure also has a high Q value which results in a very sharp resonance peak and ringing which last for an extended period after pulse excitation. The bimorph structure using ceramic material is also expensive to manufacture.

Figure 18:
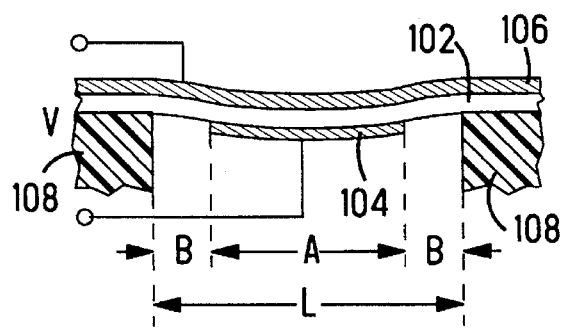
FIG. 18 illustrates a sectional view of an ultrasonic asymmetrical bimorph transducer of an embodiment of the present invention.

A bimorph structure of an embodiment of the present invention particularly suitable for use as an ultrasonic proximity sensor mountable on a vehicle for example, is illustrated in FIG. 18. There a metal layer 106 such as brass, stainless steel or the like is bonded to a surface of the PVDF film 102 with an epoxy. The metal layer 106 functions as a first electrode and is oriented towards the environment as a protective layer of the PVDF film 102. Electrode 104 is bonded to the surface of the PVDF film 102 along a central region A. The electrode 104 does not extend along the edge regions B of the PVDF film 102 near the support areas. Accordingly, expansion and shrinkage of the PVDF film 102 occurs only along the central region A.

The PVDF film bimorph structure of FIG. 18 is less expensive than the ceramic bimorph structure of FIG. 17 since a polymer PVDF film is generally cheaper than a ceramic PZT material. Also, the PVDF film bimorph structure is less brittle than the ceramic bimorph structure.

The embodiment described above relates to an ultrasonic transducer assembly used as a transmitter. The same principles hold for an ultrasonic transducer assembly used as a receiver. The acoustic pressure of an ultrasonic wave impinging upon a bimorph structure produces deformation as illustrated in FIG. 16. However, the bimorph structure of FIG. 16 would produce no output voltage upon impingement of an ultrasonic wave since the voltages at edge regions B of the PVDF film 102 cancel the voltage at the central region A of the PVDF film. A receiver structure similar to the bimorph structures as shown in FIGS. 17 and 18 enables generation of an output voltage upon impingement of an ultrasonic wave.

The resonant frequency of a transducer assembly implementing the bimorph structure of FIG. 18 is determined by the length L of the bonded PVDF/metal layer between the support areas. Transmitters have been designed in accordance with the present invention which resonate at a frequency of 40 kHz. In order to resonate at a given frequency, the bimorph structure of length L must be manufactured to have a metal layer and PVDF film of appropriate thicknesses. If the bonded PVDF/metal layer is too thin, a length L which produces resonance at a given frequency must be selected to be very small. Manufacture of such a bimorph structure becomes impossible at such extremes.

The bimorph structure of FIG. 19 comprises an exemplary transmitter for an ultrasonic proximity sensor in accordance with the present invention. The bimorph structure is designed to have a resonant frequency of 40 kHz. The length L of the bimorph structure between the support members 108 was selected as 1.9 mm. In order for the bimorph structure having length L of 1.9 mm to resonate at 40 kHz, a polyester film layer such as Mylar® layer 112 of 250 micron thickness was bonded to the PVDF film 102 of 110 micron thickness. A layer of polymer materials such as non-poled PVDF, kapton polysulphon, polycarbonate or high density polyethylene may be used instead of the layer of Mylar®.

The Mylar® layer 112 was in turn bonded to the metal layer 106 comprised of brass having a thickness in the range of 50–125 microns. An electrode 114 was bonded to the PVDF film 102 at the PVDF film/Mylar® film interface. The electrode material may be Al/Ni, Au/Cr or Ni/Cu/Cr deposited on the PVDF film 102 by sputtering. The electrode material may also be silver ink. The layers were bonded together using an epoxy. The Mylar® layer was necessary so that a bimorph structure having length L of 1.9 mm could be made of appropriate thickness to resonate at 40 kHz. Without the Mylar® layer, the resulting thickness of the bimorph structure required to achieve a resonant frequency of 40 kHz would necessitate a bimorph structure of length L too small to manufacture.

The radiation beam pattern produced by the ultrasonic transmitter illustrated in FIG. 19 was found to be sharp along the vertical direction when the long side of the bimorph structure, measured as 14 mm in length for the exemplary transmitter and denoted as d, was taken to be the vertical direction of the proximity sensor as mounted upon a vehicle. The half width of the radiation beam pattern in the vertical direction is ±25°. The radiation beam pattern in the horizontal direction spread relatively wide, having a half width angle of ±80°.

Figure 20B:
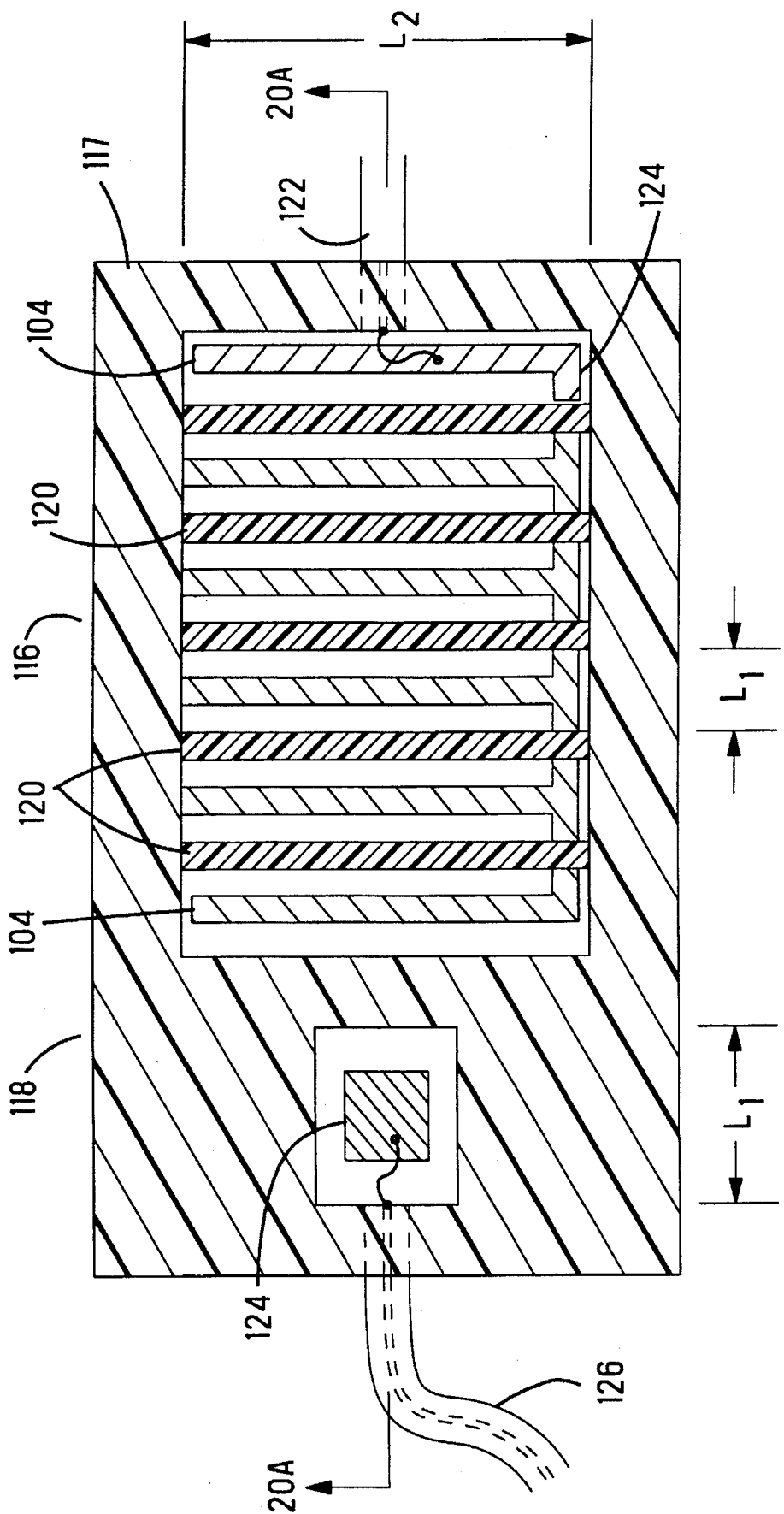
FIG. 20B is a top plan view of the proximity sensor unit of FIG. 20A taken along line 20B—20B.
Figure 20C:
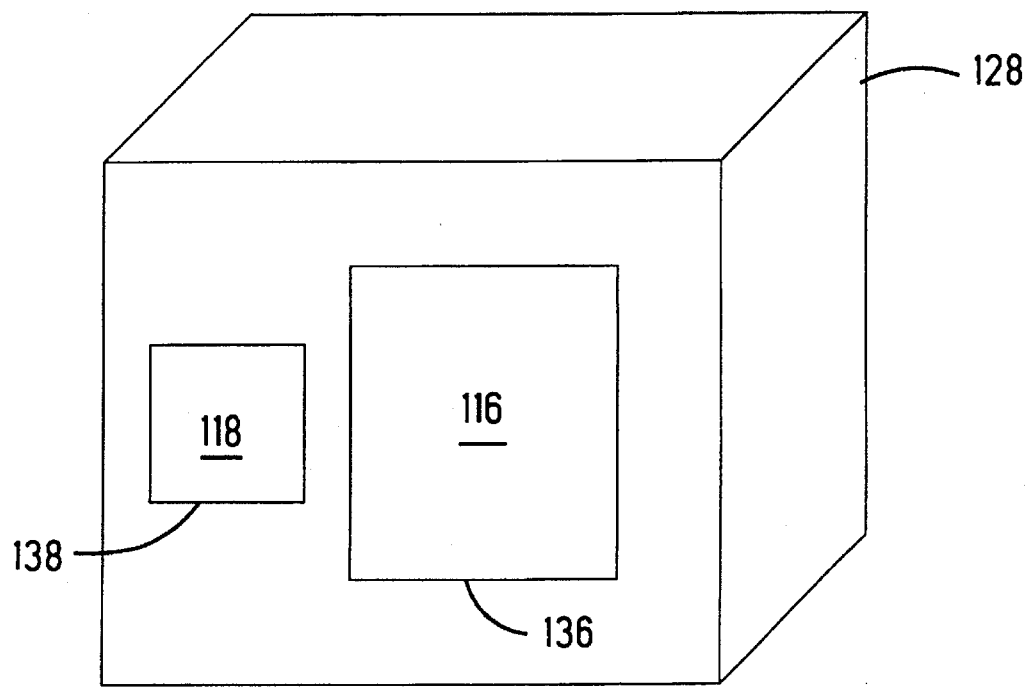
FIG. 20C illustrates a perspective view of the proximity sensor unit housing.

In order to increase the acoustic pressure of the transmitted ultrasonic wave, a plurality of bimorph structures as described with respect to FIG. 19 were placed side-by-side and coupled in parallel. All of the transducers were driven with the same phase voltage signal. The transmitter as illustrated in FIG. 20 is incorporated into a proximity sensor unit including both a transmitter array generally indicated as 116 in the side perspective view of FIG. 20A taken along line 20A—20A of the top perspective view of FIG. 20B, and an ultrasonic receiver denoted generally as 118. As illustrated, the receiver 118 includes a portion of the same PVDF film 102 of the transmitter array 116.

Accordingly, an advantageous feature of the proximity sensor unit of FIG. 20, which will be described in greater detail hereinafter, is that both the receiver and transmitter transducer structures use respective portions of the same PVDF film 102. In contrast, a proximity sensor unit made of a ceramic piezoelectric material such as PZT must include transmitter and receiver transducer structures implemented with separate PZT layers since the ceramic material is brittle and difficult to handle.

The proximity sensor unit as illustrated in FIG. 20A includes outermost metal protective layer 106 bonded to Mylar® layer 112, which is provided to maintain a desired thickness of the bimorph structures. Mylar® layer 112 is subsequently bonded to electrode 114, which is coupled to ground of the shielded cable 122. Electrode 114 is in turn bonded to PVDF film 102. As further illustrated in FIG. 20A, metal layer 106, Mylar® layer 112, electrode 114 and PVDF layer 102 extend along the entire surface of the proximity sensor unit and corresponding portions thereof respectively form part of the transmitter array 116 and receiver 118.

The above described bonded metal layer 106, Mylar® layer 112, electrode 114 and PVDF film 102 are subsequently bonded to plastic plate 117, which may be polycarbonate, acrylic or the like. Members 120 of plastic plate 117 isolate the separate transmitter bimorph structures which comprise electrodes 104 bonded on the surface of PVDF film 102 opposite electrode 114. The electrodes 104 are coupled to the shielded cable 122 and are coupled to each other via common electrode 124. Upon application of a voltage via shielded cable 122, voltage induced strain occurs in PVDF film 102 between the corresponding opposing electrodes 104 and electrode 114. The individual transmitters of the transmitter array 116 corresponding to electrodes 104 which are coupled to each other in parallel are driven with the same phase. The horizontal angle of the generated ultrasonic wave therefore becomes sharper since the effective horizontal width of the transmitter array is increased as compared with the horizontal width of a single transmitter.

The receiver 118 is formed generally in the same manner. Upon impingement of an ultrasonic wave upon metal layer 106 above electrode 124, the corresponding acoustic pressure produces deformation in the PVDF film 102 between electrodes 124 and electrode 114 generating a voltage. The voltage is output as a received signal via shielded cable 126.

The plastic plate 117 as described above is bonded to support members 108. The support members may be any hard, heavy metal such as aluminum, brass or the like or plastic such as acrylic, polycarbonate or the like. Support members 108 and plastic plate 117 effectively isolate the transmitter array 116 from the receiver 118. The proximity sensor unit as illustrated in FIGS. 20A and 20B is located within a sensor unit housing 128 which includes windows 136 and 138 through which corresponding portions of the metal layer 106 of transmitter array 116 and receiver 118 are respectively exposed to the environment. The sensor unit housing may be a metal such as aluminum or a plastic such as acrylic or polycarbonate, or the like.

The resonant frequency of the transmitter array 116 and the receiver 118 of the proximity sensor unit is determined by the following equation:

$$f_o = \frac{\pi}{2} A \left( \frac{1}{L_1^2} + \frac{1}{L_2^2} \right) \quad (9)$$

wherein $L_1$ and $L_2$ are the corresponding dimensions of the bimorph structures of the transmitter array 116 and the receiver 118. In equation (9), A is given by the following equation:

$$A = \frac{\sqrt{-Y_p(y_0^2 h_p - y_0((h_m + h_p)^2 - h_m^2) + 1/3[(h_m + h_p)^3 - h_m^3] - Y_m\left(y_0^2 h_m - y_0 h_m^2 + \frac{h_m}{3}\right)}}{h_p \rho_p + h_m \rho_m} \quad (10)$$

In equation (10), $y_0$ is given by the following equation:

$$y_0 = \frac{Y_m \frac{h_m^2}{2} + Y_p h_p \left( h_m + \frac{h_p}{2} \right)}{Y_m h_m + Y_p h_p} \quad (11)$$

wherein the various parameters are defined as noted below along with corresponding values for a proximity sensor unit designed in accordance with the present invention.

The dimensions and materials selected for the described design example are given below by way of illustration only and are not limitative of the present invention.

$L_1$, $L_2$=length of each side of vibration region of bimorph structure
$Y_p$=Young's modulus of polymer=$7 \times 10^9$ N/m$^3$
$\rho_p$=density of polymer=$1.1 \times 10^3$ kg/m$^3$
$Y_m$=Young's modulus of metal=$1.2 \times 10^4$ N/m$^3$
$\rho_m$=density of metal=$8.4 \times 10^3$ kg/m$^3$
$h_m$=thickness of metal=$5 \times 10^{-5}$ m
$h_p$=thickness of polymer=$3.64 \times 10^{-4}$ m
$y_0$=position of the neutral line on which strain due to vibration becomes zero The values $L_1$=$L_2$=5.3 mm were selected for the receiver of the above described proximity sensor unit to provide a resonant frequency of $f_0$=40 kHz. The values $L_1$=3.8 mm and $L_2$=15 mm were selected for the transmitter array of the proximity sensor unit to provide a resonant frequency of $f_0$=40 kHz. The values of Young's modulus and the density of the PVDF and Mylar® were taken as approximately the same. The position of the neutral line is measured from the exposed surface of the metal layer 106.

A further embodiment of the proximity sensor unit particularly suitable for use in an outdoor environment will now be described with reference to FIG. 21, which generally illustrates a curved length mode transducer structure. The structure shown in FIG. 21 comprises metal protection layer 206 bonded to PVDF film 202 by epoxy. The opposite ends of the bonded metal/PVDF layer are clamped or secured to support members (not shown) at points C and D. Upon application of a voltage across the PVDF film 202 via metal layer 206 and electrode 204, length expansion and shrinkage vibration motion generates a vibration normal to the plane leading to generation of an ultrasonic wave. The resonant frequency of the curved length mode transducer structure is dependent upon the curvature radius R. The metal layer 206 appreciably influences the resonant frequency of the curved length mode transducer structure. The resonant frequency $f_0$ is given by the following equation:

$$f_o = \frac{1}{2\pi R} \sqrt{\frac{Y_m h_m + Y_p h_p}{\rho_m h_m + \rho_m h_p}} \quad (12)$$

The various parameters of equation 12 are defined similarly to those set forth previously with respect to equations (9)–(11).

Although the curved length mode transducer is a bimorph structure, bending vibration of the transducer does not occur since the resonant frequency for deformation and bending in the bimorph mode is very low. In the curved length mode, the radius R is chosen so that the transducer assembly resonates at the resonance of the curved length mode, therefore vibrating at the high frequency resonance to generate an ultrasonic wave.

Figure 21:
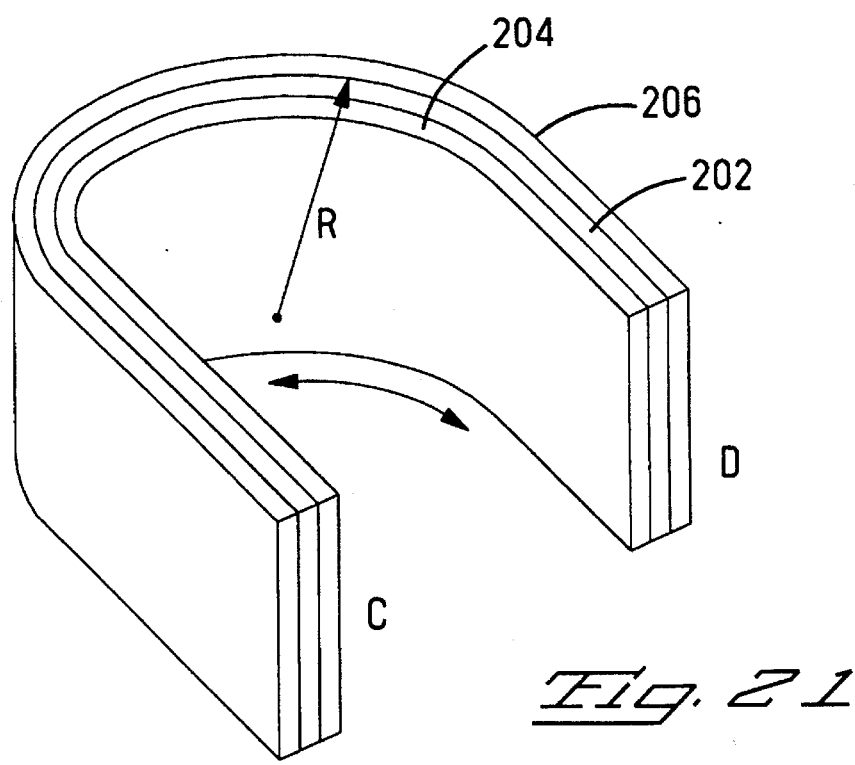
FIG. 21 illustrates a curved length mode transducer of a further embodiment of the present invention.

Experimental results show that a resonant frequency of 44 kHz for a curved length mode transmitter as embodied in FIG. 21 can be produced under the conditions of R=1.27 cm using a 50 micron thick brass protection layer 206 and a 28 micron thick PVDF film 202.

A more detailed description of a proximity sensor unit including the curved length mode transducer structure described generally in FIG. 21 is provided hereinbelow with reference to FIGS. 22A–22C.

Figure 22C:
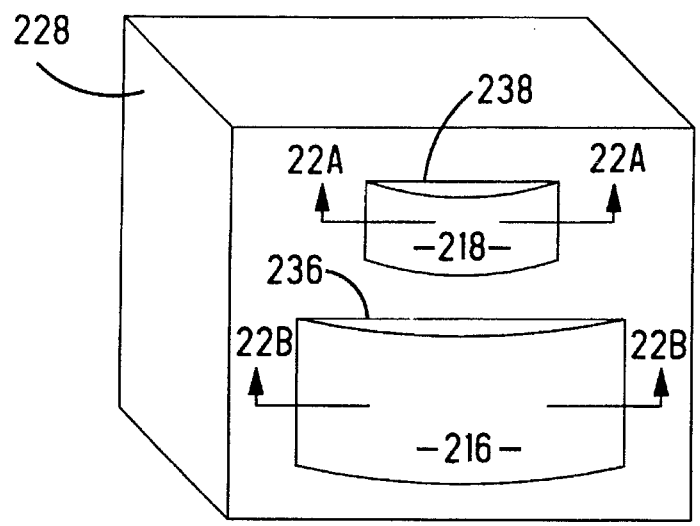
FIG. 22C illustrates a perspective view of the proximity sensor unit housing.

FIG. 22A illustrates a sectional view of receiver section 218, taken along line 22A—22A of FIG. 22B which illustrates proximity sensor housing 228. Electrode 214 is bonded to a surface of PVDF film layer 202. Metal protection layer 206 is bonded to electrode 214 via epoxy bonding layer 230. The metal protection layer 206 is exposed to the environment through window 238 of housing 228 for receiver 218, as illustrated in FIG. 22C. Electrode 204 is bonded to a surface of PVDF film 202 opposite the surface on which electrode 214 is bonded. Upon impingement of an ultrasonic wave on the metal protection layer 206 of the curved length transducer, deformation of the PVDF film 202 between electrodes 214 and 204 occurs, producing a voltage along the PVDF film 202 which is output as a voltage from electrode 204.

The curvature of the above described bonded layers is provided by support member 208 which includes curved supporting members 240. As illustrated in FIG. 22A, the curved supporting members 240 extend beyond the surface at which PVDF film 202 is bonded to the support member 208 and support the bonded layers to create the radius of curvature of the bonded layers which forms the curved length mode receiver structure.

A gap 242 exists between curved support members 240 and the PVDF film 202 along the curved length mode transducer. When the curved structure of the bonded layers of the curved length mode transducer is pressed by a strong force, permanent deformation is prevented by gap 242. In order to enable recovery, gap 242 must be larger than at least twice the amplitude of vibration of the transducer, which is typically approximately 5 microns at 40 kHz. In this embodiment, gap 242 has a thickness in the range of 25 microns to 100 microns. Curved support member 240 includes holes 244 drilled therethrough in which air can pass from air cavity 246 formed within the rear portion of support member 208 through to gap 242. Holes 244 prevent positive and negative pressure variations from forming in gap 242 during a cycle of vibration, which would tend to suppress vibration of the bonded layers.

The curved length mode transmitter section as illustrated in FIG. 22B, which is taken along line 22B—22B of FIG. 22C, is designed in a manner similar to the receiver as described above with respect to FIG. 22A. In FIG. 22B, like parts are denoted similarly as in FIG. 22A and detailed description is omitted for brevity. Upon application of a voltage across electrodes 204 and 214, voltage produced deformation occurs along the portion of PVDF film 202 between electrodes 204 and 214. The resulting vibration of the bonded layers produces an ultrasonic wave. The transmitter 216 illustrated in FIG. 22B has a larger area than the receiver 218 illustrated in FIG. 22A since greater area enables generation and transmission of a stronger ultrasonic wave.

Figure 23:
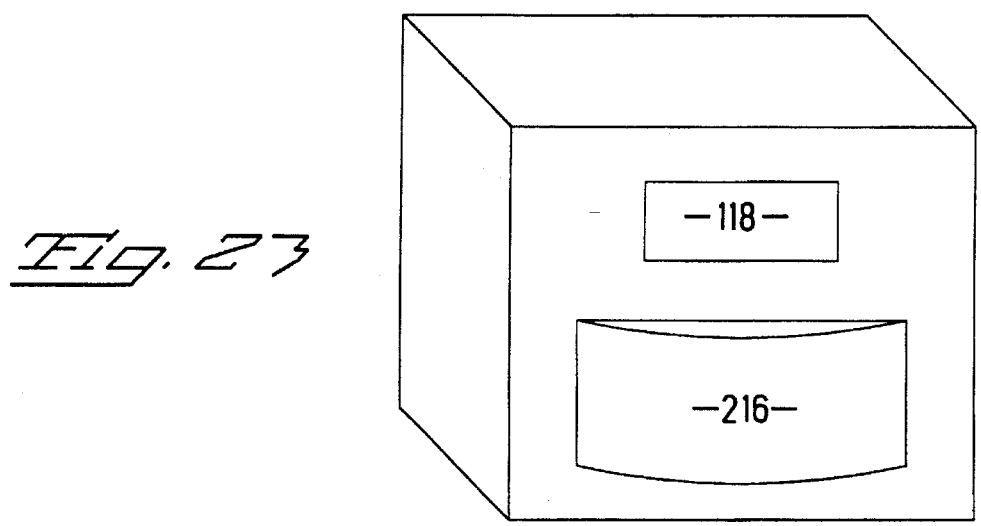
FIG. 23 illustrates a perspective view of a proximity sensor unit housing including a curved length mode transmitter and an asymmetrical bimorph receiver.
Figure 24:
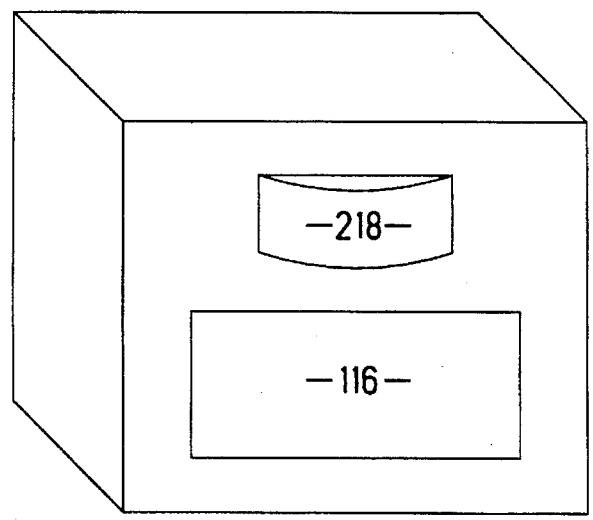
FIG. 24 illustrates a perspective view of a proximity sensor unit housing including an asymmetrical transmitter and a curved length mode receiver.

The proximity sensor unit is not limited as described above. For instance, it is possible to combine the asymmetric bimorph receiver 118 described with respect to FIGS. 20A–20C with the curved length mode transmitter 216 in a proximity sensor unit as illustrated in FIG. 23. It is also possible to combine the curved length mode receiver 218 with the asymmetric bimorph transmitter 116 in a proximity sensor unit as illustrated in FIG. 24. Moreover, the Mylar® layer can be used in any of the embodiments illustrated to provide proper thickness to enable the transducers to have a particular resonant frequency.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A transducer assembly for a proximity sensor comprising:

a polymer piezoelectric film having opposing first and second surfaces, said second surface of said polymer piezoelectric film being secured at first and second ends in a first direction to respective first and second support members;

a first electrode bonded to said first surface of said polymer piezoelectric film;

a polyester spacer film bonded to said first electrode;

a metal protective layer bonded to said polyester spacer film;

a second electrode bonded to said second surface of said polymer piezoelectric film spaced from and intermediate said first and second support members in the elongated direction; and voltage supply means for applying a voltage across said first and second electrodes to radiate an ultrasonic wave from said protective metal layer.

2. The transducer assembly of claim 1, wherein said metal protective layer comprises brass.

3. The transducer assembly of claim 2, wherein said metal protective layer is within a range of 50–125 microns thick.

4. The transducer assembly of claim 1, wherein a width of said second electrode in the first direction is 1.9 mm and a resonant frequency of the transducer assembly is 40 kHz.

5. The transducer assembly of claim 4, wherein said polyester spacer film is 250 microns thick and said polymer piezoelectric film is 110 microns thick.

6. The transducer assembly of claim 1, wherein said polymer piezoelectric film comprises poly-vinylidene fluoride.

7. The transducer assembly of claim 1, wherein said polyester film comprises Mylar®.

8. The transducer assembly of claim 1, wherein a resonant frequency of the transducer assembly is determined in accordance with a width of said second electrode in the first direction, a thickness of said polyester spacer film and a thickness of said polymer piezoelectric film.

9. A transducer assembly for a proximity sensor comprising:

a polymer piezoelectric film having opposing first and second surfaces, said second surface of said polymer piezoelectric film being secured at first and second ends in a first direction to respective first and second support members;

a first electrode bonded to said first surface of said polymer piezoelectric film;

a polyester spacer film bonded to said first electrode;

a metal protective layer bonded to said polyester spacer film;

a second electrode bonded to said second surface of said polymer piezoelectric film intermediate said first and second support members in the first direction;

voltage supply means for applying a voltage across said first and second electrodes to radiate an ultrasonic wave from said protective metal layer; and a third support member having an arcuate support surface for supporting said polymer piezoelectric film between said first and second support members.

10. The transducer assembly of claim 9, addition-ally including a gap formed between said arcuate support surface of said third support member and said polymer piezoelectric film.

11. The transducer assembly of claim 10, addition-ally including an air cavity formed along a rear face of said third support member opposite said arcuate support surface.

12. The transducer assembly of claim 11, said third support member having holes therethrough for allow-ing air flow between said gap and said air cavity.

13. The transducer assembly of claim 9, wherein said arcuate support surface of said third support member is convex in the elongated direction.

14. A proximity sensor unit comprising:

a polymer piezoelectric film having opposing first and second surfaces, said second surface of said polymer piezoelectric film being secured in a first direction to respective first and second support members;

a first electrode bonded to said first surface of said polymer piezoelectric film;

a polyester spacer film bonded to said first electrode;

a metal protective layer bonded to said polyester spacer film;

a plurality of second electrodes of first predetermined width in the first direction bonded to said second surface of said polymer piezoelectric film between said first and second support members;

a plurality of isolation members bonded to said second surface of said polymer piezoelectric film for isolating said plurality of second electrodes from each other in the first direction, said plurality of second electrodes respectively being bonded to said second surface spaced from and intermediate said plurality of isolation members and said first and second support members; and voltage supply means for applying a voltage across each of said plurality of second electrodes and said first electrode to radiate an ultrasonic wave from said protective metal layer.

15. The proximity sensor unit of claim 14, further comprising:

a third support member on which said second surface of said polymer piezoelectric film is secured;

a third electrode of second predetermined width in the first direction bonded to said second surface of said polymer piezoelectric layer spaced from and intermediate said first and third support members; and output means for outputting a voltage indicative of impingement of an ultrasonic wave on said metal protective layer in a vicinity of said third electrode.

* * * * *